(12) United States Patent  (10) Patent No.: US 9,381,894 B2
Koo  (45) Date of Patent: Jul. 5, 2016

(54) INTEGRATED BRAKING SYSTEM

(71) Applicant: Hyundai Mobis Co., Ltd., Seoul (KR)

(72) Inventor: Chang Hoe Koo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 70 days.

(21) Appl. No.: 14/268,787

(22) Filed: May 2, 2014

(65) Prior Publication Data

US 2014/0333124 A1  Nov. 13, 2014

(30) Foreign Application Priority Data

May 13, 2013 (KR) .......................... 10-2013-0053596

(51) Int. Cl.
| | |
|---|---|
| *B60T 13/14* | (2006.01) |
| *B60T 11/28* | (2006.01) |
| *B60T 11/236* | (2006.01) |
| *B60T 7/04* | (2006.01) |
| *B60T 13/66* | (2006.01) |
| *B60T 13/68* | (2006.01) |
| *B60T 13/74* | (2006.01) |
| *B60T 8/40* | (2006.01) |

(52) U.S. Cl.
CPC ............... *B60T 7/042* (2013.01); *B60T 8/4081* (2013.01); *B60T 13/146* (2013.01); *B60T 13/662* (2013.01); *B60T 13/686* (2013.01); *B60T 13/745* (2013.01)

(58) Field of Classification Search
CPC ....... B60T 7/042; B60T 13/148; B60T 13/66; B60T 13/686; B60T 13/58; B60T 13/142; B60T 11/236; B60T 13/146; B60T 13/745; B60T 13/168; B60T 7/20; B60T 7/06; B60T 8/4081; B60T 8/4018; B60T 8/4827; F04B 5/02

USPC .................................. 303/10, 3, 14, 6.01, 15
See application file for complete search history.

(56) References Cited

U.S. PATENT DOCUMENTS

| | | | | |
|---|---|---|---|---|
| 2008/0216473 | A1* | 9/2008 | Kim ..................... | B60T 11/236 60/588 |
| 2012/0013174 | A1* | 1/2012 | Ishida .................... | B60T 8/441 303/10 |
| 2012/0119566 | A1* | 5/2012 | Ohnishi ................. | B60T 7/042 303/20 |
| 2012/0248861 | A1* | 10/2012 | Miyata ................... | B60T 8/4275 303/10 |
| 2012/0313427 | A1* | 12/2012 | Nishioka ................ | B60T 7/042 303/10 |
| 2013/0134768 | A1* | 5/2013 | Ito ......................... | B60L 3/0092 303/3 |
| 2013/0207452 | A1* | 8/2013 | Gilles .................... | B60T 8/4018 303/9.75 |
| 2013/0213025 | A1* | 8/2013 | Linden .................. | B60T 8/4018 60/327 |

FOREIGN PATENT DOCUMENTS

WO  WO 2013/017037 A1  2/2013

* cited by examiner

*Primary Examiner* — Robert A Siconolfi
*Assistant Examiner* — San Aung
(74) *Attorney, Agent, or Firm* — NSIP Law

(57) ABSTRACT

Disclosed is an integrated braking system including a hydraulic piston cylinder unit that is operated by a brake pedal, a pressure medium storage unit that is connected to the hydraulic piston cylinder unit, a pressure generating unit that is driven by a motor, and has first and second hydraulic chambers that are divided by a piston movable within a housing, and a pressure control unit that transmits a pressure to a wheel unit from the hydraulic piston cylinder unit and the pressure generating unit. A hydraulic line directly connects the first hydraulic chamber and the pressure medium storage unit.

10 Claims, 2 Drawing Sheets

INTEGRATED BRAKING SYSTEM

CROSS-REFERENCE TO RELATED APPLICATION

This application claims priority to and the benefit of Korean Patent Application No. 10-2013-0053596 filed in the Korean Intellectual Property Office on May 13, 2013, the entire contents of which are incorporated herein by reference.

TECHNICAL FIELD

The present invention relates to an integrated braking system, and more particularly, to an integrated braking system that solves problems of durability and valve operation noise of a shutoff valve.

BACKGROUND OF THE INVENTION

An integrated braking system is a technology of an integrated braking system that integrates ESC and an electric booster, and FIG. 1 illustrates an integrated braking system according to the related art.

The braking system illustrated in the drawing includes a hydraulic piston cylinder 2 that can be substantially moved by a brake pedal 1, a moving simulator device 3 that interacts with the hydraulic piston cylinder 2, a pressure medium storage 4 that is connected to the hydraulic piston cylinder 2, a pressure generating unit 5 that can be electrically controlled, a pressure control unit whose outlet ports are connected to wheels 8, 9, 10 and 11 of a vehicle (not illustrated), inlet and outlet valves 6a to 6d and 7a to 7d, and an electronic control and adjustment unit 12 that activates components that can be electrically controlled.

Pressure are applied to inlet ports of the inlet valves 6a to 6d through pressure lines I and II, and pressure sensors 22 and 23 are provided to measure pressures within the pressure lines I and II. Return lines 14a and 14b are provided at outlet ports of the outlet valves 7a to 7d. Further, the hydraulic piston cylinder 2 which is a moving unit of the braking system has two hydraulic pistons 15 and 16 within a housing 21, and the hydraulic pistons are provided in series. Pressure chambers 17 and 18 are provided together with the hydraulic pistons 15 and 16. The pressure chambers 17 and 18 may be connected to the pressure medium storage 4 through connection lines.

Meanwhile, the pressure chambers 17 and 18 are connected to the pressure lines I and II through hydraulic lines, and the pressure lines I and II are connected to the inlet ports of the inlet valves 6a to 6d or the pressure control unit. Shutoff valves 24a and 24b are respectively provided at the hydraulic lines. Furthermore, pressure sensors 25 are respectively provided at the hydraulic lines. Here, a piston rod 26 connected to the brake pedal 1 interacts with the first piston 15.

The pressure generating unit 5 is designed as a hydraulic cylinder piston or an electric hydraulic actuator, and a piston 33 may be operated by an electric motor through a rotational and translational motion. Meanwhile, the pressure generating unit 5 may include two hydraulic chambers 31 and 32 with the piston 33 interposed therebetween, and the two hydraulic chambers 31 and 32 are connected to the pressure lines I and II through hydraulic lines. Meanwhile, check valves 45 and 46 are provided at the hydraulic lines of the hydraulic chambers 31 and 32.

The above-stated braking system operates the shutoff valves 24a and 24b along with operation of the brake pedal 1 to shut off hydraulic connection between the brake pedal 1 and the wheels 8, 9, 10 and 11 and operates the motor to transmit hydraulic pressures through the hydraulic chambers 31 and 32. FIG. 1 illustrates the operation of the connection lines. A sky-blue line depicts movement of a pressure transmitted by the operation of the brake pedal 1 by a driver, a red line depicts movement to transmit a pressure to the wheels 8, 9, 10 and 11 by the operation of the motor, and a green line depicts movement to transmit a pressure to the wheels 8, 9, 10 and 11 by the hydraulic chamber 31.

Meanwhile, in the braking system, in general, when the shutoff valves 24a and 24b are closed, connection between the pressure medium storage 4 and the hydraulic chamber 32 of the pressure generating unit 5 is shut off. Accordingly, after the brake pedal 1 is released, in order to allow the hydraulic chamber 32 to be in an atmospheric pressure state by connecting the pressure medium storage 4 and the hydraulic chamber 32, the shutoff valves 24a and 24b are opened again. When the shutoff valves 24a and 24b are continuously closed, even though the piston 33 is returned, a residual pressure may be generated by oil introduced through the check valve 46. Accordingly, the braking system needs to constantly operate or stop the shutoff valves 24a and 24b depending on the operation of the brake pedal 1.

However, as mentioned above, when the shutoff valves 24a and 24b are operated whenever the brake pedal 1 is operated, plunger impact noise may be caused by frequent operation of the shutoff valves 24a and 24b. Furthermore, the number of operations of the shutoff valves 24a and 24b is increased, durability of the shutoff valves 24a and 24b may be degraded. Moreover, when the brake pedal 1 is quickly depressed, if operation responses of the shutoff valves 24a and 24b are slower than an application speed of the brake pedal 1, this may cause inconvenience in the brake pedal 1.

Accordingly, in order to solve the aforementioned problems, an applicant of the present invention has invented a braking system with more reliability.

[Patent Literature 1] International Patent Publication No. WO 2013/017037 (published on Feb. 9, 2012)

SUMMARY OF THE INVENTION

The present invention has been made in an effort to provide an integrated braking system capable of solving problems of operation noise and durability of a shutoff valve.

An exemplary embodiment of the present invention provides an integrated braking system including a hydraulic piston cylinder unit that is operated by a brake pedal, a pressure medium storage unit that is connected to the hydraulic piston cylinder unit, a pressure generating unit that is driven by a motor, and has first and second hydraulic chambers that are divided by a piston within a housing, and a pressure control unit that transmits a pressure to a wheel unit from the hydraulic piston cylinder unit and the pressure generating unit. A hydraulic line connects the first hydraulic chamber and the pressure medium storage unit. This hydraulic line accommodates flow in both directions when the piston of the pressure generating unit is in a predetermined position to equalize pressures in the first hydraulic chamber and the pressure medium storage unit.

Two seal cups may be provided at an inner wall of the housing, and a flow path connected to the hydraulic line may be provided between the seal cups.

A piston provided within the housing may include a body, and a hollow cylindrical part that is formed to face a front side of the body. A penetrating hole may be formed in an end of the cylindrical part.

A part of a first hydraulic line connecting the first hydraulic chamber of the pressure generating unit and the pressure control unit may be connected to the pressure medium storage unit. A check valve may be provided at a flow path connecting the first hydraulic line and the pressure medium storage unit.

A part of a second hydraulic line connecting the second hydraulic chamber of the pressure generating unit and the pressure control unit may be connected to the pressure medium storage unit. A check valve may be provided at a flow path connecting the second hydraulic line and the pressure medium storage unit.

According to an exemplary embodiment of the present invention, since the integrated braking system includes the flow path that directly connects the pressure generating unit and the pressure medium storage unit, it is possible to reduce operation noise of the shutoff valves and to improve durability of the shutoff valves. Further, it is possible to prevent inconvenience caused in the pedal when the brake pedal is quickly depressed.

DETAILED DESCRIPTION OF THE EMBODIMENTS

Hereinafter, an integrated braking system according to an exemplary embodiment of the present invention will be described with reference to the drawings. Meanwhile, descriptions of components having the same functions as those described in the related art will not be presented.

Figure 1:
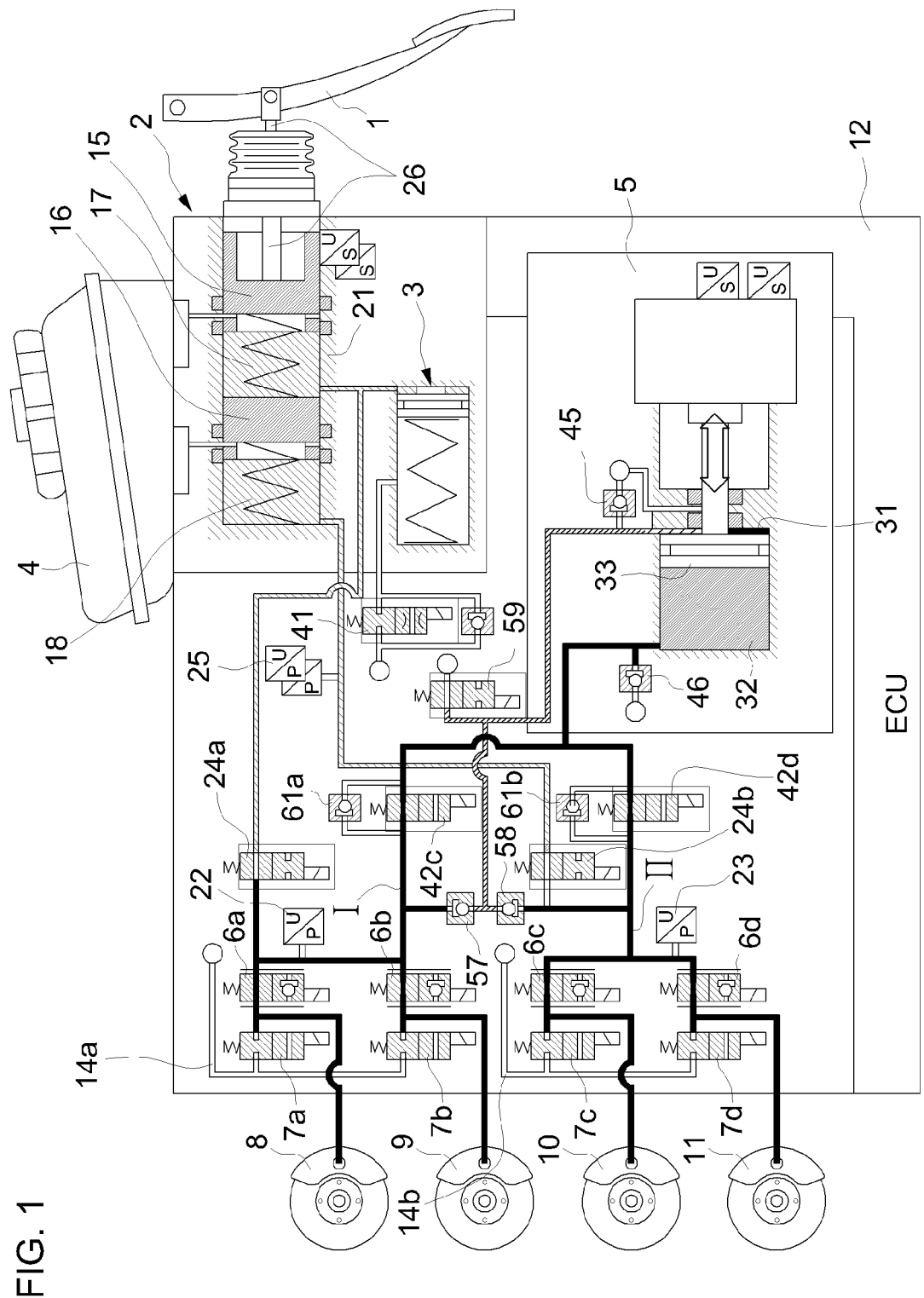
FIG. 1 illustrates an integrated braking system according to the related art.

As described in the related art, the present invention is characterized in that the configuration of the integrated braking system disclosed in International Patent Publication No. WO 2012/017037 is improved. More specifically, as illustrated in FIG. 1, since the pressure medium storage 4 and the hydraulic chamber 32 of the pressure generating unit 5 are connected through the shutoff valves 24a and 24b, in the integrated braking system according to the related art, the shutoff valves 24a and 24b needs to be constantly operated along with the operation of the brake pedal 1. Accordingly, in order to solve the above-stated problems, the applicant of the present invention has solved the aforementioned technical problems by forming a flow path that directly connects the hydraulic chamber 32 of the pressure generating unit 4 and the pressure medium storage 4, and such a configuration will be described below in more detail with reference to the drawings. Meanwhile, configurations that are not related to the technical features of the present invention are replaced with the descriptions described in the related art.

Figure 2:
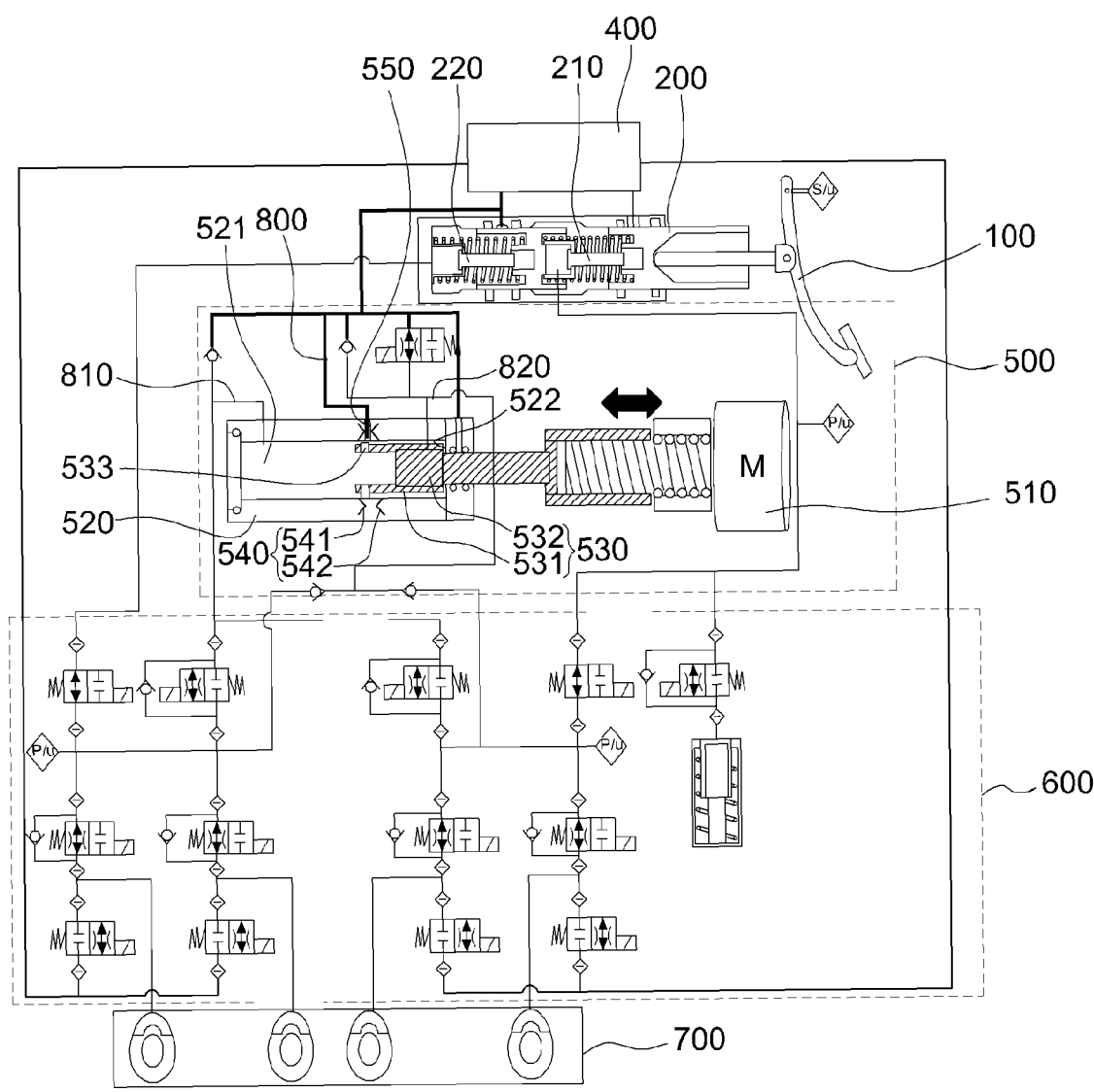
FIG. 2 illustrates an integrated braking system according to an exemplary embodiment of the present invention.

As illustrated in FIG. 2, the integrated braking system according to the present invention may include a hydraulic piston cylinder unit 200 that is moved by a brake pedal 100, a pressure medium storage unit 400 that is connected to the hydraulic piston cylinder 200, a pressure generating unit 500 that is driven by a motor 510 and has two hydraulic chambers 521 and 522 that are divided by a piston 530 within a housing 520, and a pressure control unit 600 that transmits pressures to a wheel unit 700 from the hydraulic piston cylinder 200 and the pressure generating unit 500. Meanwhile, the hydraulic piston cylinder unit 200 includes a first pressure chamber 210 and a second pressure chamber 220, and the first pressure chamber 210 and the second pressure chamber 220 are respectively connected to the pressure medium storage 400 unit through flow paths.

Meanwhile, the integrated braking system according to the present invention includes a hydraulic line 800 connecting the first hydraulic chamber 521 of the pressure generating unit 500 and the pressure medium storage unit 400. In order to form the hydraulic line 800 connecting the first hydraulic chamber 521 and the pressure medium storage unit 400, a first seal cup 541 and a second seal cup 542 are formed at an inner wall of the housing 520 having the first hydraulic chamber 521 in both directions, as illustrated in the drawing. A flow path 550 is connected to the hydraulic line 800 between the two seal cups 540.

Meanwhile, the first hydraulic chamber 521 and the second hydraulic chamber 522 that are formed within the housing 520 are partitioned by the piston 530, and when the piston 530 is returned rearward, the first hydraulic chamber 521 and the pressure medium storage unit 400 may be connected to each other through the hydraulic line 800. Accordingly, in order to achieve the aforementioned configuration, the piston 530 according to the present invention may include a body 532, and a hollow cylindrical part 531 that is formed to face a front side of the body 532. In addition, a penetrating hole 533 is formed in an end of the cylindrical part 531.

Accordingly, as illustrated in the drawing, by forming the piston 530 having the above-stated configuration, when the piston 530 of the pressure generating unit 500 is returned rearward, the penetrating hole 533 formed in the end of the cylindrical part 531 of the piston 530 passes through the seal cup 540. At this time, the first hydraulic chamber 521 and the pressure medium storage unit 400 are connected to each other through the hydraulic line 800 to maintain the atmospheric pressure state. That is, unlike the related art, the first hydraulic chamber 521 and the pressure medium storage unit 400 can be connected regardless of the operation of the shutoff valves according to the related art. Accordingly, the problem caused by the frequent operation of the shutoff valves in the related art can be solved, and durability can be further improved.

A part of the first hydraulic line 810 connecting the first hydraulic chamber 521 of the pressure generating unit 500 and the pressure control unit 600 may be connected to the pressure medium storage unit 400. In this case, a check valve may be provided at the flow path connecting the first hydraulic line 810 and the pressure medium storage 400.

A part of the second hydraulic line 820 connecting the second hydraulic chamber 522 of the pressure generating unit 500 and the pressure control unit 600 may be connected to the pressure medium storage unit 400. In this case, a check valve may be provided at the flow path connecting the second hydraulic line 820 and the pressure medium storage unit 400.

Although an exemplary embodiment of the present invention has been described, those skilled in the art will variously modify and change the present invention through supplement, change, deletion, addition of the constituent element, and the like, without departing from the spirit of the present invention defined in the claims, and the modification and the change will belong to the scope of the right of the present invention.

What is claimed is:

1. An integrated braking system comprising:
a hydraulic piston cylinder unit operated by a brake pedal;
a pressure medium storage unit connected to the hydraulic piston cylinder unit;
a pressure generating unit driven by a motor, and having first and second hydraulic chambers divided by a piston movable within a housing;
a pressure control unit connected to a wheel unit, the hydraulic piston cylinder unit and the pressure generating unit, and an equalization hydraulic line connecting the first hydraulic chamber of the pressure generating unit and the pressure medium storage unit, the equalization hydraulic line accommodating flow in both directions when the piston of the pressure generating unit is in a predetermined position, to equalize pressures in the first hydraulic chamber and the pressure medium storage unit.

2. The integrated braking system of claim 1, wherein two seal cups are provided at an inner wall of the housing, and a flow path connected to the equalization hydraulic line is provided between the seal cups.

3. The integrated braking system of claim 2, wherein the piston of the pressure generating unit has a hollow cylindrical portion with a penetrating hole at an end thereof, the penetrating hole aligning with the flow path between the seal cups when the piston of the pressure generating unit is in the predetermined position.

4. The integrated braking system of claim 1, wherein a first hydraulic line connects the first hydraulic chamber of the pressure generating unit and the pressure control unit, and a part of the first hydraulic line is connected to the pressure medium storage unit.

5. The integrated braking system of claim 4, wherein a check valve is provided along the part of the first hydraulic line that connects to the pressure medium storage unit.

6. The integrated braking system of claim 1, wherein a second hydraulic line connects the second hydraulic chamber of the pressure generating unit and the pressure control unit, and a part of the second hydraulic line is connected to the pressure medium storage unit.

7. The integrated braking system of claim 6, wherein a check valve is provided along the part of the second hydraulic line that connects to the pressure medium storage unit.

8. The integrated braking system of claim 1, wherein the piston of the pressure generating unit has a hollow cylindrical portion with a penetrating hole at an end thereof.

9. An integrated braking system comprising:
a hydraulic piston cylinder unit operated by a brake pedal;
a pressure medium storage unit connected to the hydraulic piston cylinder unit;
a motor-driven pressure generating unit having first and second hydraulic chambers divided by a piston movable within a housing, and an equalization flow path through a wall of the housing communicating with the first hydraulic chamber;
a hydraulic line connecting the equalization flow path to the pressure medium storage unit; and
a pressure control unit connected to a wheel unit, the hydraulic piston cylinder unit and the pressure generating unit,
wherein the piston of the pressure generating unit is configured to block the equalization flow path except when the piston is in a predetermined position that permits pressures in the first hydraulic chamber and the pressure medium storage unit to equalize through the equalization flow path and the hydraulic line.

10. The integrated braking system of claim 9, wherein the predetermined position of the piston of the pressure generating unit is substantially at an end of its stroke, where the volume of the first hydraulic chamber is substantially maximized.

* * * * *